(12) United States Patent
Millar et al.

(10) Patent No.: US 8,795,578 B2
(45) Date of Patent: Aug. 5, 2014

(54) APPARATUS AND METHOD FOR FORMING FIBRE REINFORCED COMPOSITE STRUCTURES

(75) Inventors: William James Trevor Millar, Ballyclare (GB); Robert Samuel Wilson, Belfast (GB); Jonathan James McConnell, Belfast (GB)

(73) Assignee: Short Brothers PLC, Belfast (IE)

( * ) Notice: Subject to any disclaimer, the term of this patent is extended or adjusted under 35 U.S.C. 154(b) by 582 days.

(21) Appl. No.: 12/669,563

(22) PCT Filed: Jul. 19, 2007

(86) PCT No.: PCT/GB2007/002750
§ 371 (c)(1),
(2), (4) Date: Jan. 18, 2010

(87) PCT Pub. No.: WO2009/010706
PCT Pub. Date: Jan. 22, 2009

(65) Prior Publication Data
US 2010/0193114 A1 Aug. 5, 2010

(51) Int. Cl.
*B29C 51/10* (2006.01)
(52) U.S. Cl.
USPC ......... 264/511; 264/571; 156/245; 156/441.5
(58) Field of Classification Search
None
See application file for complete search history.

(56) References Cited

U.S. PATENT DOCUMENTS

| | | | |
|---|---|---|---|
| 4,065,340 A * | 12/1977 | Dickerson | 156/154 |
| 5,076,880 A * | 12/1991 | Spengler et al. | 156/382 |
| 2003/0019567 A1 | 1/2003 | Burpo et al. | |
| 2005/0006823 A1 | 1/2005 | Merrick | |
| 2006/0068170 A1* | 3/2006 | Hanson | 428/174 |

FOREIGN PATENT DOCUMENTS

| | | |
|---|---|---|
| GB | 2316036 | 2/1998 |
| WO | WO 97/12738 | 4/1997 |
| WO | WO 03/031159 | 4/2003 |

OTHER PUBLICATIONS

International Search Report, dated Mar. 19, 2008, for International Patent Application No. PCT/GB2007/002750, filed on Jul. 19, 2007.

\* cited by examiner

*Primary Examiner* — Monica Huson
(74) *Attorney, Agent, or Firm* — Thomas, Karceski & Karmilovich, PC

(57) ABSTRACT

A method and apparatus for forming a fiber reinforced composite structure comprising at least two components, a hard base tool presenting a first tool face, a second tooling element presenting a second tool face to locate the second component against the first component. Components are of a dry fibrous form and are to be injected with a liquid resin. A flexible bagging blanket forms with the tools a sealed enclosure into which the resin is injected to form the structure by resin transfer infusion. To maintain the relative dispositions of the components without the need for elaborate mandrel plates, control rods are inserted at least partially through the two components to act as fasteners and to maintain the relative disposition of the components during resin injection. After injection the assembly is cured and the control rods may remain in situ or be removed from the structure.

24 Claims, 10 Drawing Sheets

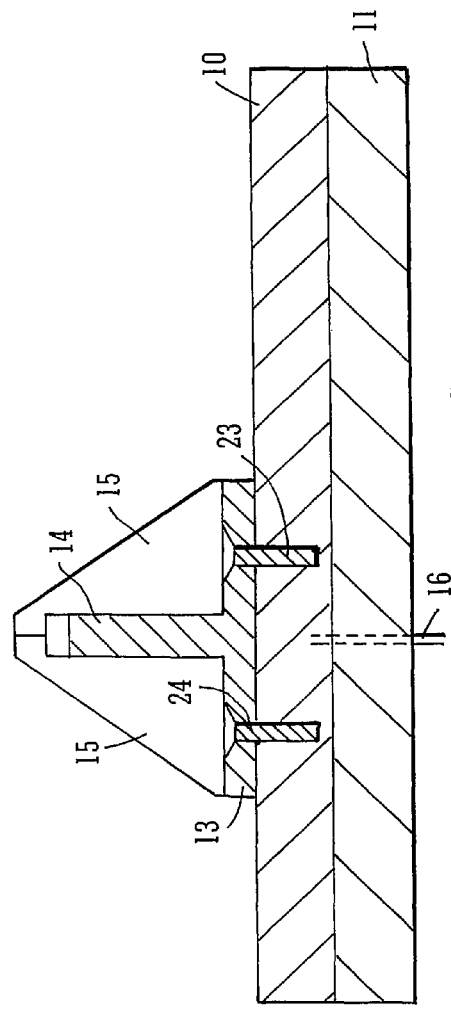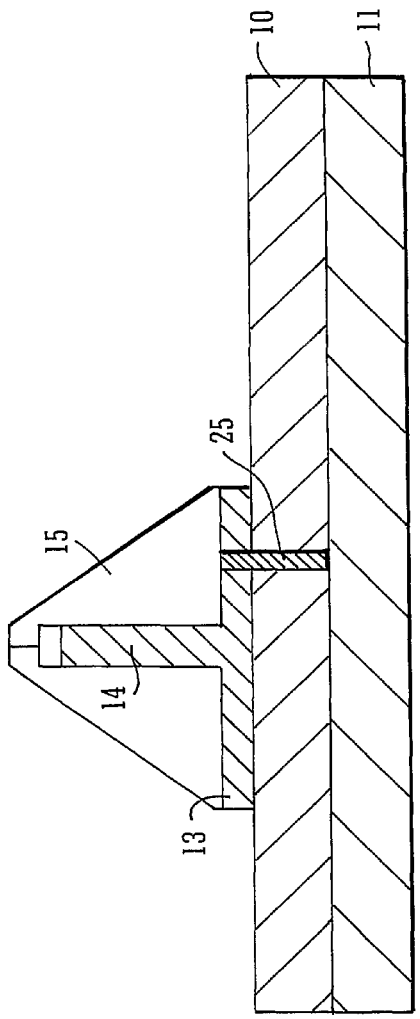

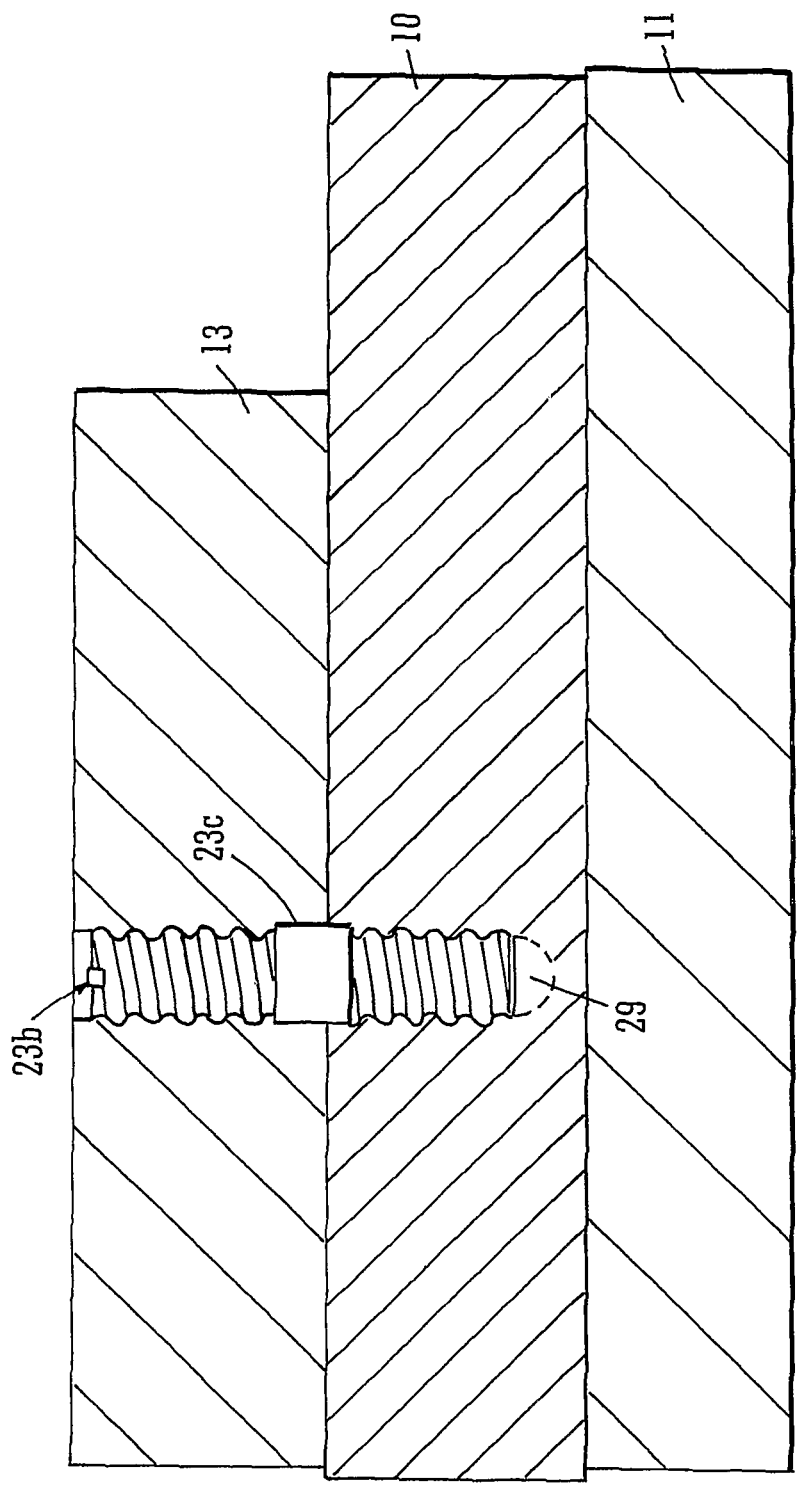
FIG. 5AAA

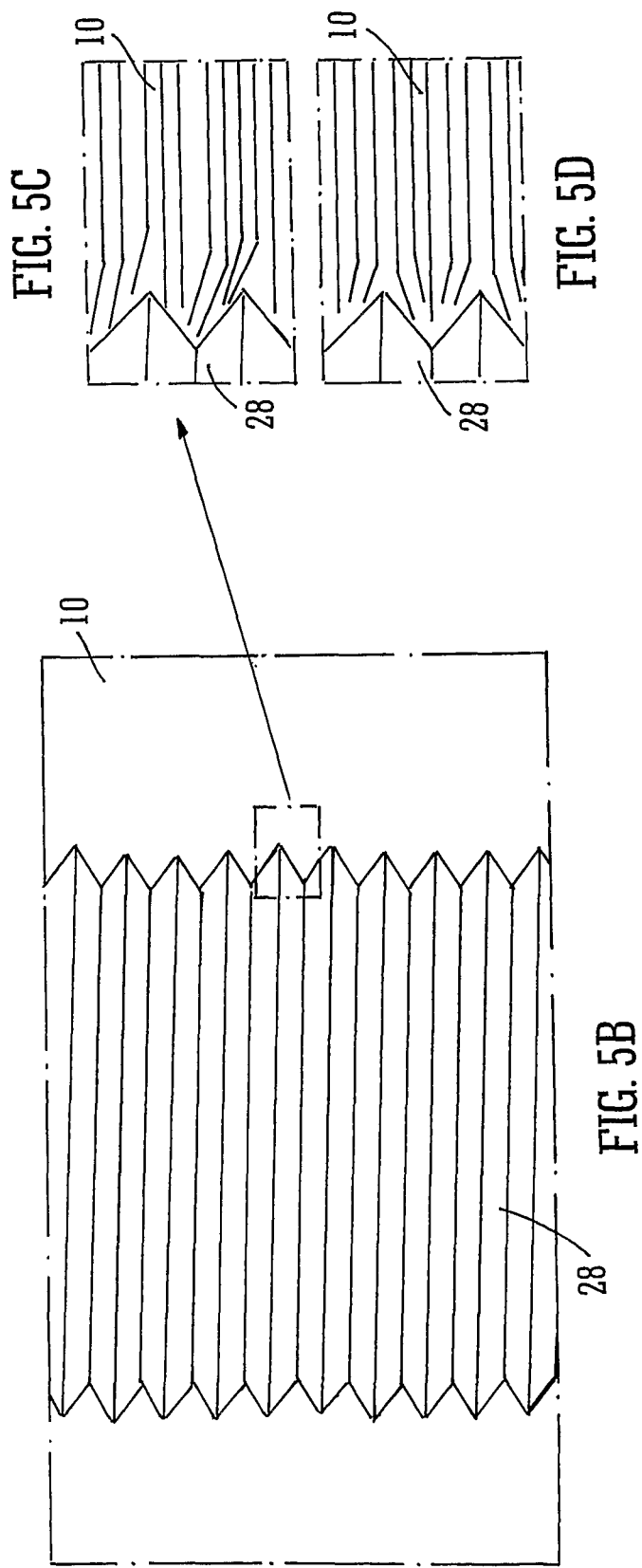

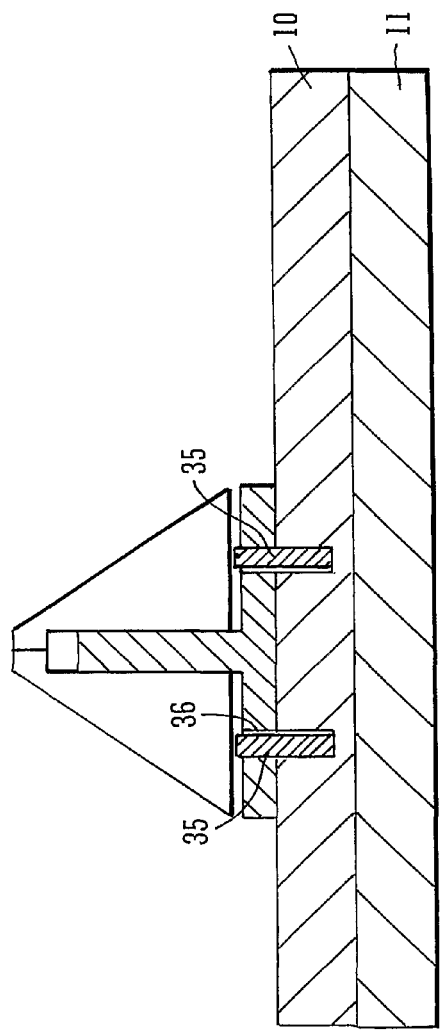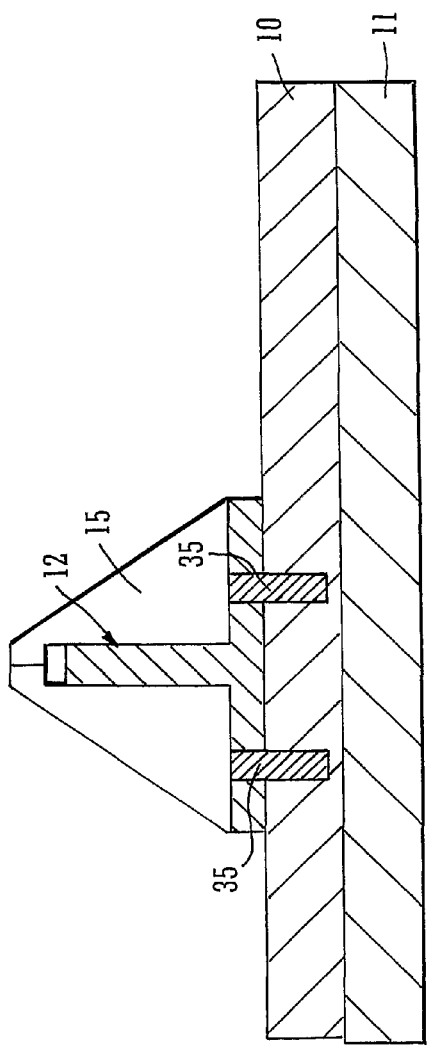

US 8,795,578 B2

APPARATUS AND METHOD FOR FORMING FIBRE REINFORCED COMPOSITE STRUCTURES

CROSS-REFERENCE To RELATED APPLICATION(S)

This is a National Stage Entry into the United States Patent and Trademark Office from International PCT Patent Application No. PCT/GB2007/002750, having an international filing date of 19 Jul. 2007, the contents of which are incorporated herein by reference.

FIELD OF THE INVENTION

This invention concerns an apparatus for and method of forming a fibre reinforced composite structure having at least two components conjoined, the structure being formed by providing the components in the form of reinforcing fibrous preforms, locating them face to face on or between hard base tool surfaces, injecting a liquid resin into the fibrous preforms and curing the resin to form the composite structure.

DISCUSSION OF RELATED ART

The use of advanced composites, specifically carbon/epoxy materials for the manufacture of, for example, airframe structures, has, in recent years, been used significantly more commonly for both commercial and military aircraft. The object has been to produce lightweight, corrosion and fatigue resistant structures. Specifically, weight reductions of between 15% and 25% have been achieved due to improved strength and stiffness, and this has resulted in considerably reduced maintenance and inspection costs as a result of the improved fatigue resistant properties achieved. The technique enables the production of smooth aerodynamic profiles while avoiding the high tooling costs incurred in producing metallic components with complex three dimensional curvature.

Autoclave cured "pre-pregs", ie, individual fibrous components which are pre-impregnated with resin and then assembled as required, have been developed but traditionally are costly to manufacture and incur process difficulties.

Consequently, laminating processes have been developed which involve infusion of low viscosity structural resin into "dry" carbon fibre preforms which are preformed layers of carbon fibres fixed in predetermined orientations. Such processes are often referred to as 'resin transfer moulding' and 'resin transfer infusion'. Typical structures to be produced in this way are wing and stabiliser structures for aircraft, in which, for example, it may be required to produce a wing skin with spaced, generally parallel stiffeners such that the skin and the stiffeners must be securely fastened together in such a way as to avoid undue stresses in the finished components, and wherein the need to utilise material-expensive and time consuming procedures with large numbers of mandrels applied to the structure during production, is avoided.

High dimensional accuracy in the formation of such components is achievable with the resin transfer moulding process which uses hard matched tooling to both faces of the tool. In this process one or more dry fibrous preforms are firstly compressed in a mould cavity formed by upper and lower matched hard tooling parts. Liquid resin is then injected into the mould cavity under pressure with the intention of fully impregnating the preforms. If two components are involved then these are formed together with accuracy owing to the matched tooling parts. The injection of liquid resin may be carried out with or without vacuum assistance.

Because of the hard tooling on both faces of the preforms, the resin is injected edgewise into the fibrous preform and must therefore infuse through the entire preform to achieve complete wet out. There are limitations to the resin transfer moulding process. These include:

a) considerable costs incurred for the two-part hard tooling, particularly for large components;
b) the dimensional accuracy and relative positioning of the finished components, which depends upon the compressibility of the fabric preforms coupled with the tooled stiffness, the matching accuracy of the tool and the injection pressure;
c) the time taken to enable complete infusion of the preforms may be outside the usable resin injection time;
d) the forces imposed on the tooling edges can be high during tool closing, leading to possible damage, thickness variation or movement of the preforms;
e) perfect matching of the upper and lower tools. (The sealing and high vacuum integrity of the tool can be difficult to achieve especially for complex and large components); and
f) unless the coefficients of thermal expansion of the tool parts and the preforms are closely matched the dimensional accuracy may be compromised.

Since the alternative resin transfer infusion process described in specification GB 2316036 uses a flexible, usually elastomeric, bagging blanket which cooperates with a single hard based tool to form the sealed enclosure, some of the aforementioned difficulties are overcome. In this case, the preform, with or without a further preform component, is laid up on the base tool and the flexible blanket is applied over the preform, the whole assembly being placed in an autoclave. Vacuum is applied to the area inside the bag to evacuate air from the preform while liquid resin is allowed to be drawn into the preform. The flexible upper tooling provided by the blanket helps facilitate resin infusion across the upper surface of the preform in contrast to the resin transfer moulding process which is largely edge infusion. Thus, larger and more complex components can be formed using the RTI process.

However, the use of flexible upper tooling makes it difficult to attain accurate final thickness of the component, since the flexible blanket takes up a final position dependent upon various factors, including the quantity of resin required, the aerial weight of the fabric, the resin rheology, gel and cure characteristics, the vacuum level in the preform prior to injection, the resistance offered by the blanket and the external pressure applied, and the wet out efficiency of the fibrous preform. This difficulty can be avoided largely by incorporating thickness control plates and spacer rods.

In addition, where two fibrous preforms are superimposed beneath the blanket, it is necessary to ensure that the components remain in the correct disposition and do not suffer relative movement during resin infusion. Accurate positioning has been achieved by using a complex and expensive matrix of removable mandrels to determine the relative positions of the components prior to and during resin infusion.

SUMMARY OF THE INVENTION

It is an object of the present invention to avoid the use of such mandrels by providing alternative means for ensuring location and relative disposition of the preform components.

According to one aspect of the present invention there is provided apparatus for forming a fibre reinforced resin composite structure having at least two components, comprising a hard base tool which presents a tool face having a lay-up region for lay-up of a first reinforcing fibre preform; a second tooling element which presents a second tool face over the lay-up region to locate a second reinforcing fibre preform against the first reinforcing fibre preform; a flexible bagging blanket for overlying the lay-up region and cooperating with the tool faces to form a sealed enclosure which encloses the first and second reinforcing fibre preforms; a liquid resin source; and a liquid resin inlet which communicates with the sealed enclosure and which is connected to the liquid resin source for injection of liquid resin into the sealed enclosure to form a liquid resin/reinforcing fibre preform system for liquid resin impregnation of the reinforcing fibre preforms; characterised by at least one rigid control rod inserted in a bore so as to pass at least partially through the first and second reinforcing fibre performs to maintain the relative disposition of said preforms during the liquid resin injection.

A vacuum outlet may communicate with the sealed enclosure and which is adapted in use to be connected to vacuum generating means to create at least a partial vacuum within the sealed enclosure.

The or each control rod may be permanently inserted within the performs.

The or each control rod may be removably inserted within the preforms.

Said at least two components may have co-planar surfaces disposed face-to-face.

The or each control rod may pass completely through a part of one of the preforms and only partially through a part of the other.

The or each control rod may pass completely through respective parts of both preforms.

A spacer rod may pass through a part of one of the preforms and abut the adjacent face of the other.

Said at least one control rod may be at least partially threaded and disposed so as to fasten the components together prior to resin injection.

At least one of the preforms may be pre-drilled to receive the or each at least partially threaded control rod, the diameter of the or each pre-drilling in at least one of the preforms being equivalent to the minimum diameter of the thread of the rod.

The or each threaded control rod may be threaded throughout its length.

The pre-drilling may be to a depth less than the length of the rod to be inserted therein, thus to leave a pre-drilled zone free for resin filling.

The or each control rod, or at least one of a plurality thereof, may be metallic.

The or each control rod, or at least one of a plurality thereof, may be formed as a reinforcing fibre preform.

According to a further aspect of the invention there is provided apparatus for forming a fibre reinforced resin composite structure as aforesaid, in combination with an autoclave adapted to contain and enclose an assembly comprising the hard base tool, the second tooling element, the reinforcing fibre preforms and the flexible bagging blanket.

According to a still further aspect of the present invention there is provided a method of forming a fibre reinforced resin composite structure having at least two components, comprising the steps of providing a hard base tool which presents a tool face having a lay-up region for lay-up of a first reinforcing fibre preform, providing a second tooling element which presents a second tool face over the lay-up region to locate a second reinforcing fibre preform against the first fibre reinforcing preform, providing a flexible bagging blanket overlying the lay-up region and cooperating with the tool faces to form a sealed enclosure enclosing the first and second reinforcing fibre preforms, injecting a liquid resin into the sealed enclosure to form a liquid resin/reinforcing fibre preform system causing liquid resin impregnation of the reinforcing fibre preforms; and allowing the resin to cure; characterised by the pre-insertion of at least one rigid control rod in a bore so as to pass at least partially through the first and second reinforcing fibre preforms to maintain the relative disposition of said preforms during the liquid resin injection.

At least a partial vacuum may be created within the sealed enclosure.

The or each control rod may remain permanently inserted within the preforms.

The or each control rod may be removed from the preforms after curing.

The components may have co-planar surfaces and be disposed face-to-face within the enclosure.

The method may include the step of enclosing the assembly comprising the hard based tool, the preforms and the flexible bagging blanket, within an autoclave in which a predetermined pressure is established during resin injection and subsequent thereto for curing.

BRIEF DESCRIPTION OF THE DRAWINGS

Embodiments of the invention will now be described, by way of example only, with reference to the accompanying drawings, in which:

FIG. 3 is a part-sectional view of a part of a two-component composite structure;

FIG. 4 is a similar view showing a different embodiment;

FIGS. 5AA and 5AAA are enlarged part-sectional view showing alternative fasteners for the two components FIGS. 5B to 5D are further enlarged views of a threaded portion of the fastener in situ;

FIG. 9 shows a different form of fastener prior to formation of the structure; and FIG. 10 is a view similar to FIG. 9, post-formation.

DETAILED DESCRIPTION OF EMBODIMENT(S) OF THE INVENTION

Figure 1:
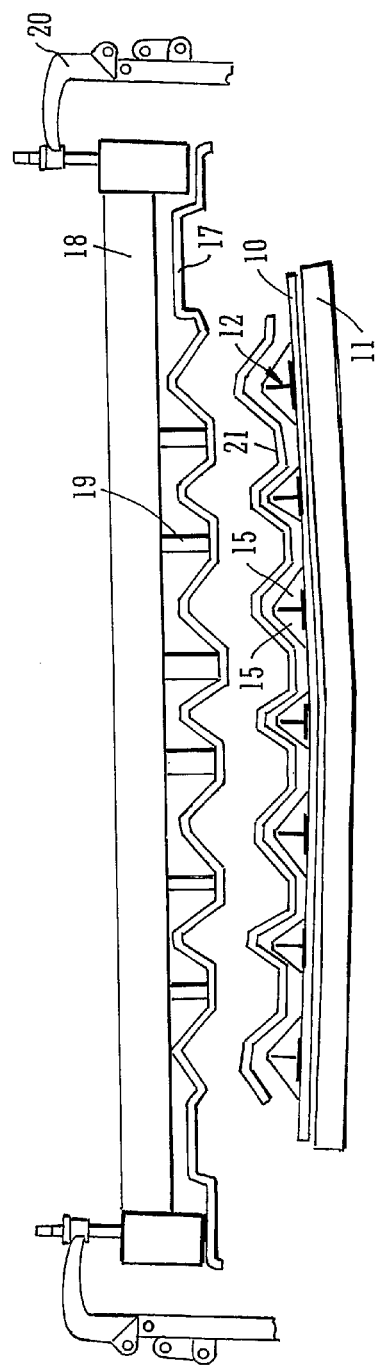
FIG. 1 schematically illustrates a conventional system for forming a fibre reinforced composite structure such as an aircraft wing with spars or cross-members.
Figure 2:
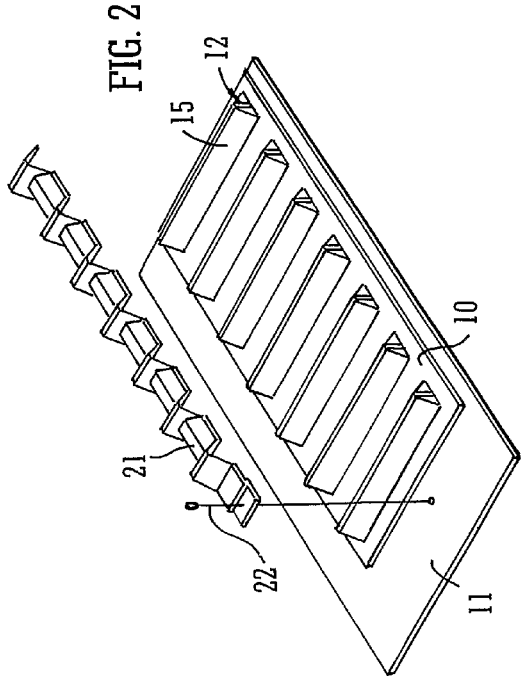
FIG. 2 isometrically illustrates parts of the system of FIG. 1.

Referring now to FIGS. 1 and 2, in a conventional system a first reinforced fibre preform 10 to be used, for example, in the construction of an aircraft wing skin, is placed on a hard base tool 11 configured to represent the required curvature for the first preform 10. Stiffeners 12 are then placed face to face upon the preform 10 and each stiffener 12 consists of a flange 13 (seen clearly in FIG. 3) and an upstanding web 14 substantially perpendicular to the flange 13. Each stiffener 12 is overlaid with a two-part upper tool 15.

A duct 16 (see FIG. 3) is provided for the supply of liquid resin to the preforms 10 and 12 whereby resin may be injected into the fibrous structure of the two preforms so that they become fully impregnated during the formation process.

A flexible bagging blanket 17 is disposed beneath a support structure 18 with bars 19 to cause the bagging blanket to form over and around the preforms 10 and 12 during resin injection. Clamping devices 20 may be provided to force the support structure 18 downwardly over the assembly of parts.

Conventionally, a complex and thus costly rib and mandrel plate system 21 has been interposed between the bagging blanket 17 and the upper surfaces of the preforms. Such a rib and mandrel plate is illustrated in FIG. 2 and this requires to be secured to the hard base tool 11 at 22.

During the resin injection process although the flexible blanket 17 locates, to some extent, the parts of the assembly in the correct disposition, however the rib and mandrel plates 21 are required to ensure accurate location at every position of the stiffeners 12, since the blanket 21, being flexible, may allow some movement during resin injection.

Several such rib and mandrel plates 21 are required across the assembly.

Referring now to FIG. 3 and in accordance with a first embodiment of the invention, the rib and mandrel plates are replaced by fasteners or control rods which, permanently or removably, pass at least partially through the first and second reinforcing fibre preforms to maintain the relative disposition of said preforms during the liquid resin injection.

In this example a first control rod 23 passes through the flange 13 of the stiffener 12 and partially through the preform 10. The rod 23 may be of metal or of ceramic material, or of a composite material. In the example shown, a further control rod 24 of a fibrous composite material also passes through the flange 13 and partially through the preform 10. In this case if the composite nature of the stiffener 12 is not fully compacted the composite material rod 24 facilitates some small movement during resin injection. A small cavity is left beneath the rod 23 which will fill with injected resin, or which can be occupied by a small amount of soft glass or ceramic.

Where the preform 10 forms the outer skin of an aircraft wing, lightning strike protection is afforded by the fact that the control rods 23, 24 do not extend fully through the preform 10.

Referring now to FIG. 4, in a further embodiment a control rod 25 extends fully through the preform 10 and through the flange 13 thereby controlling the movement of the preform 10 and stiffener 12 combination.

Figure 5A:
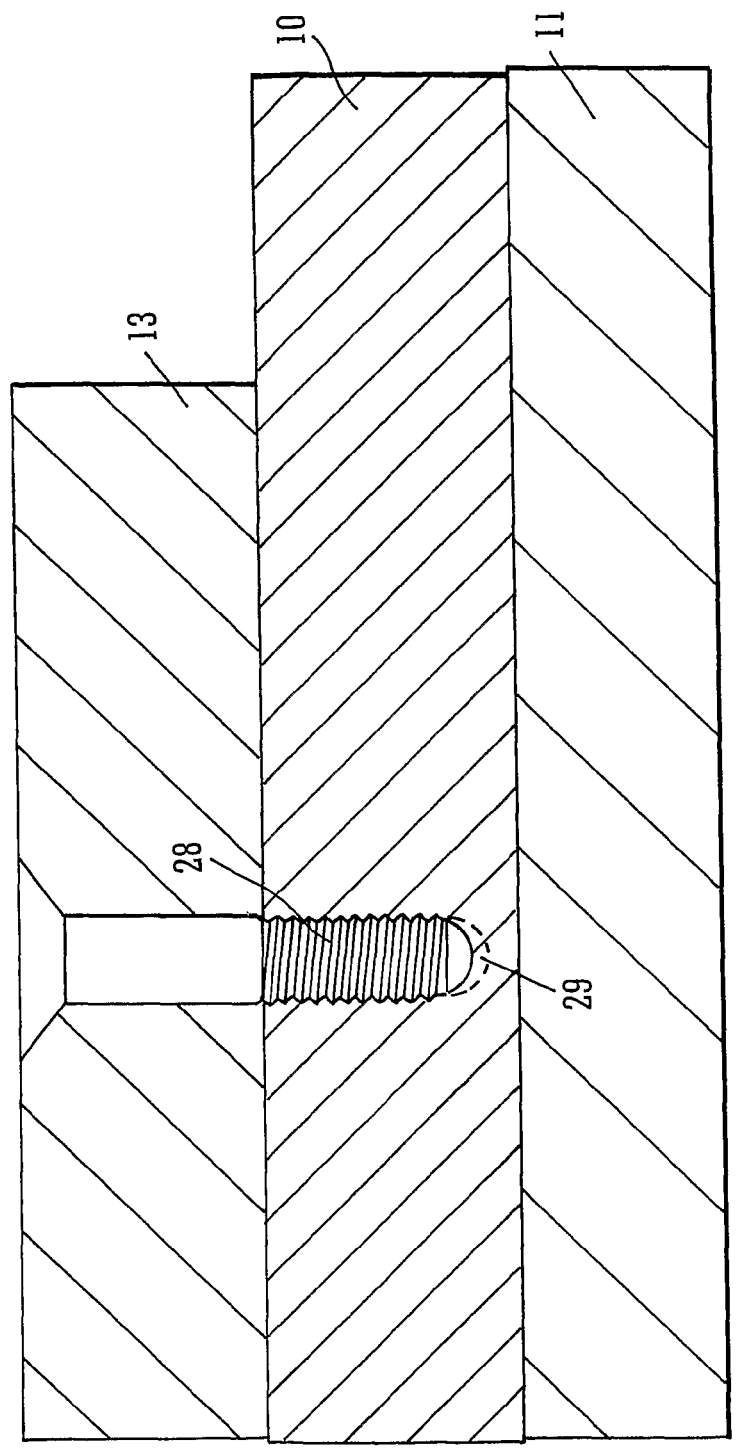
FIG. 5A is an enlarged part-sectional view showing a fastener for the two components.
Figure 5A:
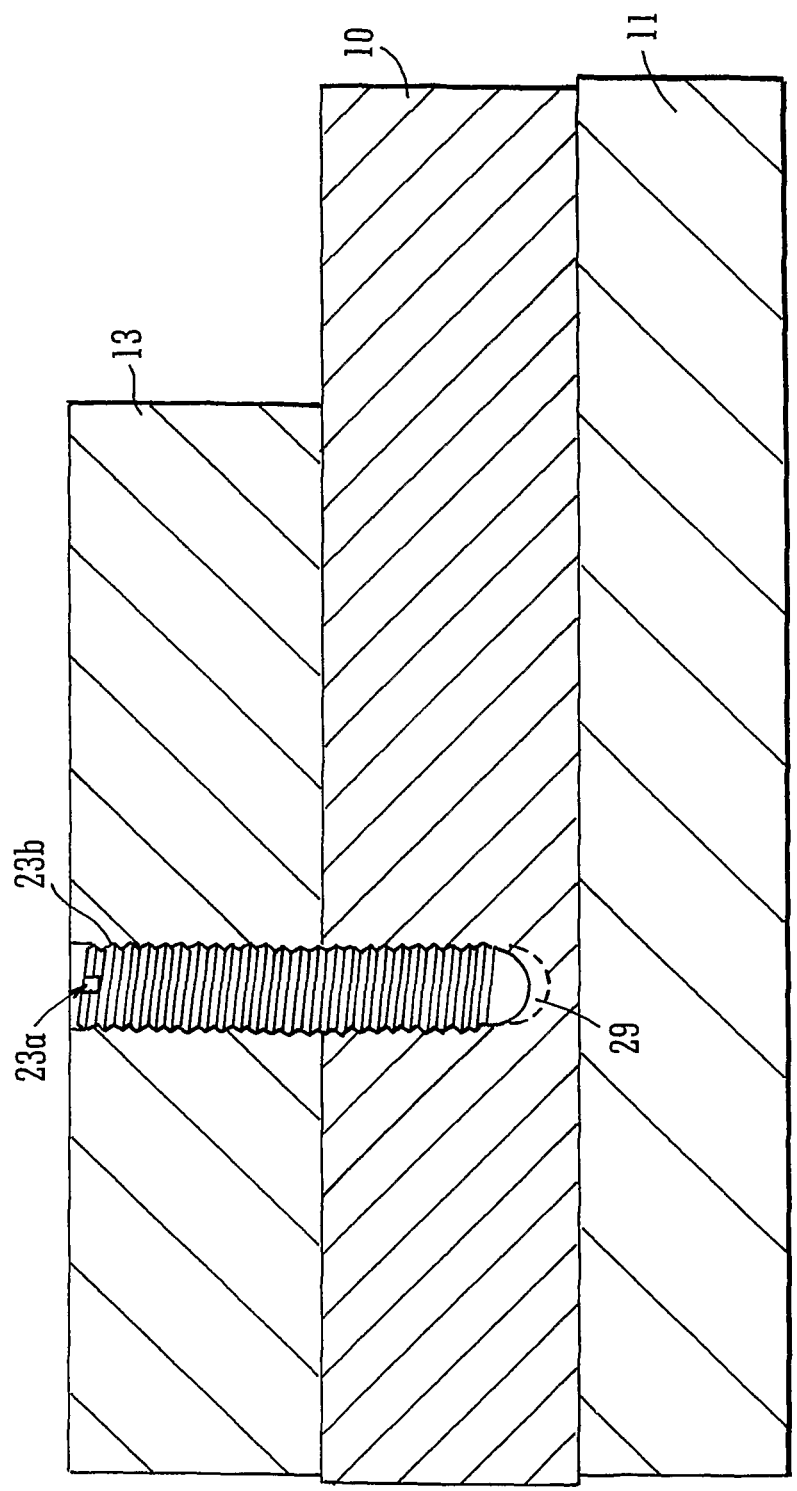

Referring now to FIG. 5A, each of the control rods 23, 25 of FIGS. 3 and 4 may be formed with a threaded portion 28 so that the rod acts as a fastener which not only prevents relative sliding movement of the preform 10 and the flange 13 but also securely fastens the two together in an axial direction of the rod.

Referring now to FIG. 5AA, each of the control rods 23, 25 of FIGS. 3 and 4 may be formed as a completely threaded rod 23a having a slot 23b for a screwdriver or Allen key to drive the rod into place. This form of rod is appropriate for use in joints which are principally subject to a shear load. The entire threaded length of the rod supports whatever minor tensile loads may exist.

Referring now to FIG. 5AAA, the controls rod 23, 25 of FIGS. 3 and 4 may be formed with a non-threaded central portion 23c to provide increased strength to shear loads as compared with the rod 23a of FIG. 5AA.

Where a threaded rod of this kind is used, an aperture is pre-drilled through the flange 13 and partly through the preform 10 to allow the threaded rod to be inserted. The pre-drilling is such as to leave a small gap 29 beyond the end of the rod for consolidation of resin during injection and the rod is installed under slight axial tension also to facilitate consolidation. Gap 29 may be filled with insulation material such as ceramic or glass fibres to improve electrical isolation for lightning strike protection purposes. It will be appreciated that the rod is inserted with the components in a dry condition, ie, prior to resin injection, and may incorporate a release interface to facilitate removal if required.

FIG. 5A includes a diagrammatic rectangular portion which is shown enlarged in FIG. 5B, and FIG. 5C shows, further enlarged, how the dry fibres are forced into the thread 28 of the rod so that after resin injection the fibres may become partially re-aligned, as can be seen in FIG. 5D.

Figure 6:
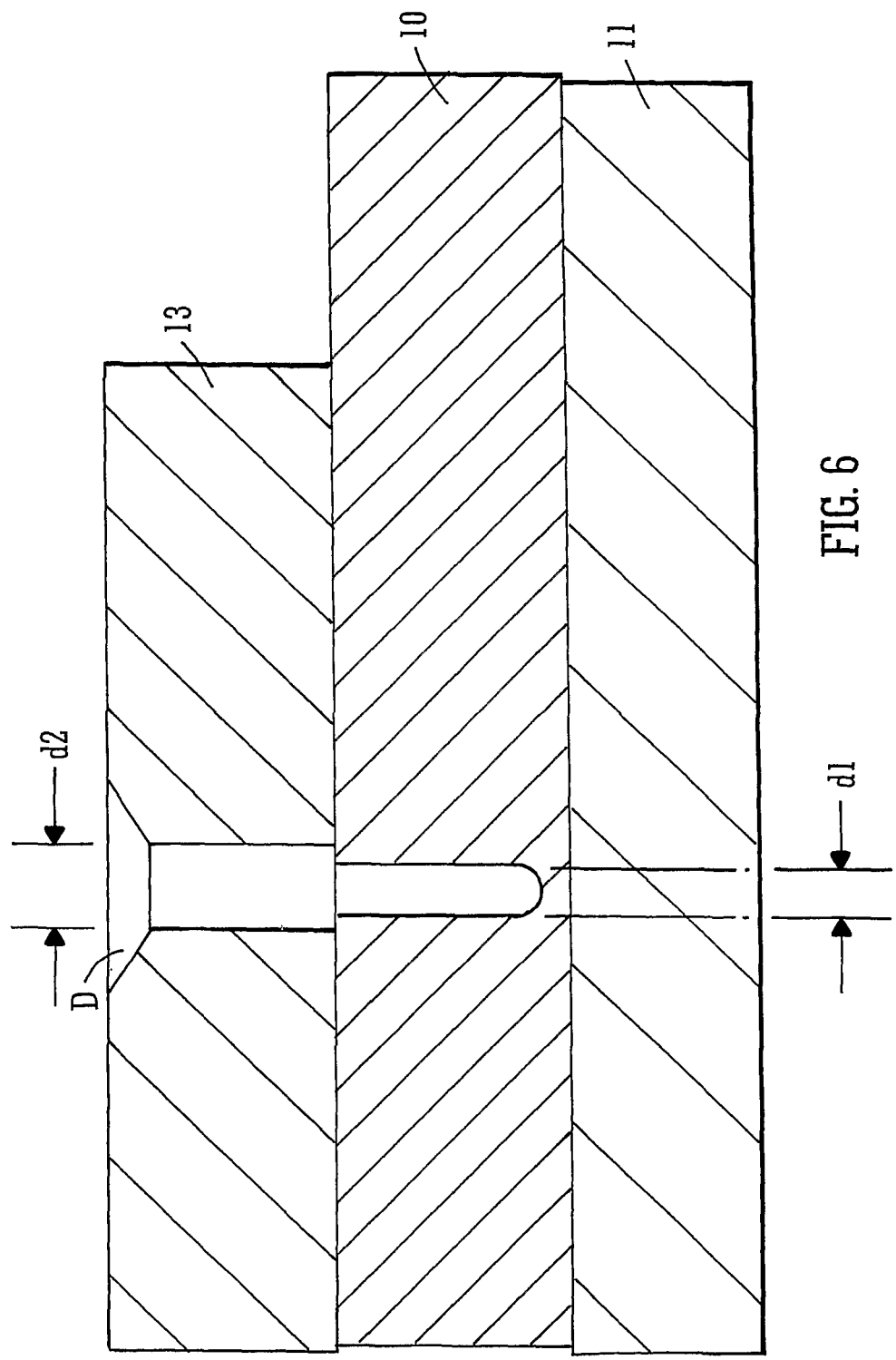
FIG. 6 is a view showing a drilled aperture for receipt of the fastener.

FIG. 6 illustrates the pre-drilling of the assembly at a first diameter d1 to accommodate the threaded part of the rod and a second, larger diameter to receive the unthreaded part. The reduced diameter d1 is equivalent to the inner diameter d2 of the threaded part. The flange 13 is also countersunk at D in the case where a rod with a countersink head is used.

Figure 7:
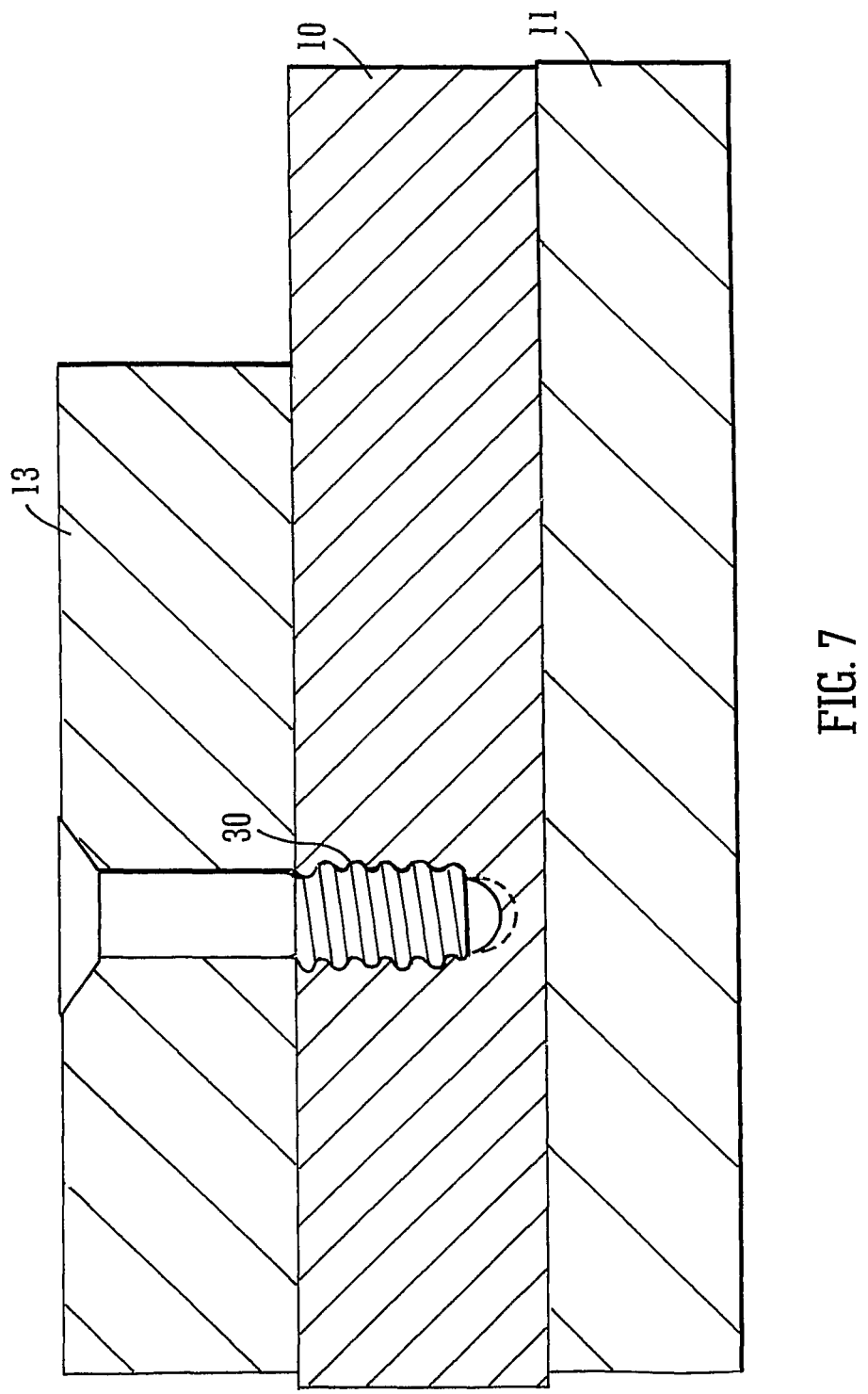
FIG. 7 shows a different form of fastener.

Referring now to FIG. 7 there is shown an embodiment in which the threaded portion 30 of a control rod has a deeper, smoother thread to minimise the risk of de-lamination of the preform layers, and in this case the pre-drilling will be at a uniform diameter equivalent to the inner diameter of the threads. Such a thread is shown also in FIG. 5AAA, by way of example. The form of thread may be determined to provide adequate resistance to the loading expected in service.

Figure 8:
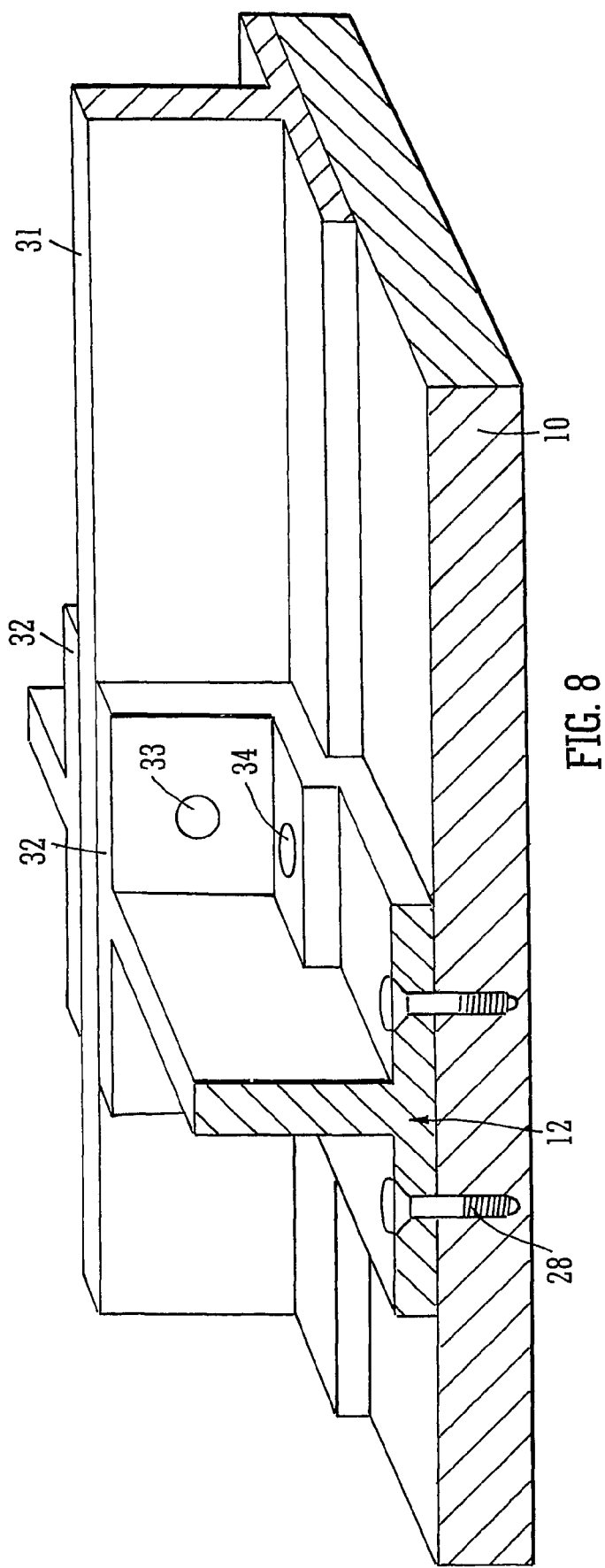
FIG. 8 illustrates a typical application of a multi-component reinforced resin composite structure made in accordance with the invention.

Referring now to FIG. 8 there is illustrated a practical application of a multi-component reinforced resin composite structure comprising the preform 10 and stiffeners 12 with threaded control rods 28. This example shows a cross-stiffener 31 while the stiffeners 12 have supporting webs 32 through which are inserted further rods 33, 34. The entire assembly illustrated in FIG. 8 may be formed in a single injection or multiple injection process.

Referring now to FIG. 9, there is illustrated a pair of pre-formed dry fibre control rods 35 in place of the rods 23, 24 of FIG. 3 and in this case the rods 35 are of reduced diameter when compared with the pre-drilled apertures 36 in which they are to be installed, but the rods are of excess length when compared with the apertures 36.

Referring now to FIG. 10, it will be seen that as the upper tool 15 bears against the fibrous rods 35 during resin injection, the rods are compressed to fill the apertures 36 thus to achieve an interference fit of the rods within their respective apertures. Also, some controlled movement of the parts of the assembly may be afforded by use of these two compressible fibre rods. The arrangement illustrated in FIGS. 9 and 10 will provide increased strength of the assembly both before and after resin injection.

It is not intended to limit the invention to the examples described and illustrated herein. Many different configurations of fibrous components making up the reinforced resin composite structure may be chosen as required, while the relative disposition of the two or more components is ensured by the use of at least one control rod between each adjacent pair of components which, during resin injection, ensures accurate location and relative disposition of the respective components. The or each rod is inserted between the components in a dry state, ie, prior to resin injection, and so controls the positioning of the components as the resin is infused into the fibrous structure of the components. Once the structure is completed and cured it is necessary only to remove it from the hard tooling whilst the need for complex and expensive rib and mandrel plates has been avoided.

The control rods, particularly those being at least partially threaded, may, if required, be pre-treated with a release agent so that they may be removed after formation of the structure. This is particularly useful where the structure is to be subsequently fastened to another structure or where a special kind of fastener is to be attached to the structure to receive, for example, cabling or the like.

The invention claimed is:

1. Apparatus for forming a fibre reinforced composite structure having at least two components comprising:
   a hard base tool which presents a tool face having a lay-up region for lay-up of a first reinforcing fibre preform;
   a second tooling element which presents a second tool face over the lay-up region to locate a second reinforcing fibre preform against the first reinforcing fibre preform;
   a flexible bagging blanket for overlying the lay-up region to form a sealed enclosure which encloses the first and second reinforcing fibre preforms;
   a liquid resin source;
   a liquid resin inlet which communicates with the sealed enclosure and which is connected to the liquid resin source for injection of liquid resin into the sealed enclosure for liquid resin impregnation of the reinforcing fibre preforms; and
   at least one rigid control rod inserted in a bore so as to pass at least partially through the first and second reinforcing fibre performs to maintain the relative disposition of said preforms.

2. The apparatus according to claim 1, wherein a vacuum outlet communicates with the sealed enclosure and is adapted in use to be connected to vacuum generator to create at least a partial vacuum within the sealed enclosure.

3. The apparatus according to claim 1, wherein the at least one rigid control rod is permanently inserted within the preforms.

4. The apparatus according to claim 1, wherein the at least one rigid control rod is removably inserted within the preforms.

5. The apparatus according to claim 1, wherein the at least two components have co-planar surfaces disposed face to face.

6. The apparatus according to claim 1, wherein the at least one rigid control rod passes completely through a part of one of the preforms and only partially through a part of the other.

7. The apparatus according to claim 1, wherein the at least one rigid control rod passes completely through respective parts of both preforms.

8. The apparatus according to claim 1, further comprising:
   a spacer rod passing through a part of one of the preforms and abutting the adjacent face of the other.

9. The apparatus according to claim 1, wherein the at least one rigid control rod is at least partially threaded and disposed so as to fasten the components together prior to resin injection.

10. The apparatus according to claim 1, wherein the at least one rigid control rod is completely threaded from end to end and has a slot for a screwdriver or Allen key to drive the rod into place.

11. The apparatus according to claim 9, wherein the at least one rigid control rod includes a non-threaded portion to provide increased strength to shear loads in the region of an interface between the first and second reinforcing fibre preforms.

12. The apparatus according to claim 9, wherein at least one of the preforms is pre-drilled to receive the at least one rigid control rod, the diameter of the pre-drilling being equivalent to the minimum diameter of the thread of the at least one rigid control rod.

13. The apparatus according to claim 12, wherein the pre-drilling is to a depth greater than the length of the at least one rigid control rod, thus leaving a pre-drilled zone free for resin filling.

14. The apparatus according to claim 13, wherein the pre-drilled zone is filled with an insulation material to improve electrical isolation for lightning strike protection purposes.

15. The apparatus according to claim 1, wherein the at least one rigid control rod is metallic.

16. The apparatus according to claim 1, wherein the at least one rigid control rod is a reinforcing fibre preform.

17. The apparatus according to claim 1 in combination with an autoclave adapted to contain and enclose an assembly comprising the hard base tool, the second tooling element, the reinforcing fibre preforms and the flexible bagging blanket.

18. A method of forming a fibre reinforced resin composite structure having at least two components, comprising:
   positioning a first reinforcing fibre preform on a hard base tool with a first tool face defining a lay-up region,
   positioning a second reinforcing fibre preform against the first fibre reinforcing preform and with respect to a second tool face,
   inserting at least one rigid control rod in a bore so as to pass at least partially through the first and second reinforcing fibre preforms to maintain the relative positions of the preforms,
   laying a flexible bagging blanket over the lay-up region to form a sealed enclosure enclosing the first and second reinforcing fibre preforms,
   injecting a liquid resin into the sealed enclosure to impregnate the reinforcing fibre preforms, and
   allowing the resin to cure.

19. The method according to claim 18, wherein the at least one rigid control rod is at least partly threaded, and an aperture extends through one of the at least two components and partly through the other to receive the at least one rigid control rod, the aperture defining a gap beyond the end of the at least one rigid control rod for consolidation of resin during injection, the at least one rigid control rod being installed under slight axial tension.

20. The method according to claim 18, wherein at least a partial vacuum is created within the sealed enclosure.

21. The method according to claim 18, wherein the at least one rigid control rod remains permanently inserted within the preform.

22. The method according to claim 18, wherein the at least one rigid control rod is removed from the preform after curing.

23. The method according to claim 18, wherein the at least two components have co-planar surfaces and are disposed face to face within the sealed enclosure.

24. The method according to claim 18, further comprising:
   enclosing the assembly comprising the hard base tool, the preforms and the flexible bagging blanket, within an autoclave in which a predetermined pressure is established during resin injection and subsequent thereto for curing.

* * * * *